(12) United States Patent
Luo et al.

(10) Patent No.: US 9,398,544 B2
(45) Date of Patent: Jul. 19, 2016

(54) DYNAMIC UPLINK POWER CONTROL

(75) Inventors: Xiliang Luo, Cardiff, CA (US); Peter Gaal, San Diego, CA (US); Hao Xu, San Diego, CA (US); Wanshi Chen, San Diego, CA (US); Tao Luo, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 13/288,754

(22) Filed: Nov. 3, 2011

(65) Prior Publication Data

US 2012/0115534 A1 May 10, 2012

Related U.S. Application Data

(60) Provisional application No. 61/410,818, filed on Nov. 5, 2010, provisional application No. 61/411,863, filed on Nov. 9, 2010.

(51) Int. Cl.
*H04B 7/00* (2006.01)
*H04W 52/28* (2009.01)
*H04W 52/14* (2009.01)

(52) U.S. Cl.
CPC .......... *H04W 52/286* (2013.01); *H04W 52/146* (2013.01)

(58) Field of Classification Search
CPC ..... H04W 52/54; H04W 72/04; H04W 72/06; H04W 72/085; H04W 72/12; H04W 72/1215; H04W 72/1226; H04W 72/1278; H04W 74/0833; H04W 74/085; H04W 88/06
USPC ........................................................ 455/522
See application file for complete search history.

(56) References Cited

U.S. PATENT DOCUMENTS 8,023,988 B2 9/2011 Shiu et al.
2006/0089104 A1* 4/2006 Kaikkonen et al. ........ 455/67.13
(Continued)

FOREIGN PATENT DOCUMENTS

CN 1304595 A 7/2001
KR 20110036492 A 4/2011
(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].
International Search Report and Written Opinion—PCT/US2011/059291—ISA/EPO—Feb. 1, 2012.
Motorola: "UL Power Control in Multi-Antenna Transmission Mode", 3GPP Draft; R1-105610 Power Control in Multi-Antenna Mode (Final Clean), 3rd Generation Partnership Project (3GPP), Mobile Competence Centre ; 650, Route Des Lucioles ; F-06921 Sophia-Antipolis Cedex ; France, vol. RAN WG1, No. X i 'an; 20101011, Oct. 5, 2010, XP050450691, [retrieved on Oct. 5, 2010].
(Continued)

*Primary Examiner* — Ajibola Akinyemi
(74) *Attorney, Agent, or Firm* — Norton Rose Fulbright US LLP

(57) ABSTRACT

Power adjustment in the user equipment (UE) includes adjusting the transmission power level for each of multiple transport blocks based on the spectral efficiency associated with the transport block. The UE receives a scheduled transport format parameter for each of multiple transport blocks to be transmitted. Based on those scheduled transport format parameters, the UE determines a transmit power level adjustment for each transport block. The UE will adjust the power according to the determined transmit power level adjustment and transmit each transport block using the adjusted power level.

55 Claims, 5 Drawing Sheets

(56) References Cited

U.S. PATENT DOCUMENTS

| | | | |
|---|---|---|---|
| 2007/0155335 A1* | 7/2007 | Love et al. | 455/69 |
| 2008/0233995 A1* | 9/2008 | Shiu et al. | H04W 52/12 455/522 |
| 2010/0023830 A1 | 1/2010 | Wengerter et al. | |
| 2010/0067396 A1* | 3/2010 | Cui et al. | 370/252 |
| 2010/0111003 A1* | 5/2010 | Phan Huy | H04L 1/0003 370/329 |
| 2010/0246705 A1 | 9/2010 | Shin et al. | |
| 2010/0290381 A1 | 11/2010 | Gu et al. | |
| 2011/0039568 A1 | 2/2011 | Zhang et al. | |
| 2011/0080972 A1 | 4/2011 | Xi et al. | |
| 2013/0051346 A1* | 2/2013 | Bergman et al. | 370/329 |
| 2013/0301588 A1* | 11/2013 | Imamura | H04L 5/0007 370/329 |

FOREIGN PATENT DOCUMENTS

| | | |
|---|---|---|
| WO | WO-2009145454 A2 | 12/2009 |
| WO | WO2010022773 A1 | 3/2010 |
| WO | WO2010107885 A2 | 9/2010 |

OTHER PUBLICATIONS

QUALCOMM Incorporated : "Power control for multi-antenna transmission", 3GPP Draft; R1-105560 Power Control for Multi-Antenna Transmission, 3rd Generation Partnership Project (3GPP), Mobile Competence Cemtre ; 650, Route Des Lucioles ; F-06921 Sophia-Antipolis Cedex ; France, vol. RAN WG1, No. Xi 'an; Oct. 11, 2010, Oct. 5, 2010, XP050450659, [retrieved on Oct. 5, 2010].

QUALCOMM Inc., "Power Control for Multi-Codeword Transmission in Rel-10," 3GPP TSG-RAN WG1 #63, R1-106347, Jacksonville, USA, Nov. 15-19, 2010, 8 pages.

ETSI TS 136 213 V8.8.0, LTE, Evolved Universal Terrestrial Radio Access (E-UTRA), Physical layer procedures(Oct. 2009), pp. 1-79.

Hattori T., et al., "All about 3G Evolution—LTE mobile Broadband Technique-," Maruzen Co., Ltd., Dec. 25, 2009, pp. 335-341, 383-388, 398-401, and 511-536, ISBN: 978-4-621-08138-9.

Samsung, "UL SU-MIMO power control", 3GPP TSG RAN WG1 Meeting #60bis, R1-102182,Beijing, China, Apr. 12-16, 2010.

* cited by examiner

DYNAMIC UPLINK POWER CONTROL

CROSS-REFERENCE TO RELATED APPLICATIONS

This application claims the benefit of U.S. Provisional Patent Application No. 61/410,818, entitled, "DYNAMIC UPLINK POWER CONTROL", filed on Nov. 5, 2010, and of U.S. Provisional Patent Application No. 61/411,863, entitled, "DYNAMIC UPLINK POWER CONTROL," filed on Nov. 9, 2010, which are expressly incorporated by reference herein in their entirety.

BACKGROUND

I. Field

The present disclosure relates generally to communication, and more specifically to power control techniques for use in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may include multiple transmit and/or receive antennas. Each UE may include multiple transmit and/or receive antennas. In certain designs, such as the Release-8 and Release-9 versions of the Long Term Evolution (LTE) standard ("Rel-8" and "Rel-9" herein), a base station may control the transmit power level of a UE by transmitting a transmit power control message to the UE from time to time. However, the need for more upstream bandwidth is ever increasing, requiring flexible and dynamic transmit power control in the uplink. Furthermore, LTE-Advanced supports multiple transmit antenna configurations in the uplink direction, requiring transmit power control of multiple antenna configurations.

There is a need to extend the existing transmit power control mechanism.

SUMMARY

These and other problems are solved by the disclosed techniques of controlling transmit power of user equipment in a wireless communication network.

In one exemplary aspect, a method of wireless communication includes receiving a scheduled transport format parameter for each of multiple transport blocks to be transmitted, determining a transmit power level adjustment for each transport block based on the scheduled transport format parameter, and transmitting each transport block using the transmit power level adjustment.

In another exemplary aspect, a method of wireless communication includes determining a scheduled transport format parameter for each of multiple transport blocks to be transmitted by a mobile device, transmitting the scheduled transport format parameter to the mobile device, and receiving the transport blocks transmitted with a transmit power level adjustment that is based on the scheduled transport format parameter.

In another exemplary aspect, a method for a wireless communication includes receiving first and second transport format parameters, determining a transmit power level adjustment based on the first and the second transport format parameters and transmitting a transport block using the transmit power level adjustment.

In another exemplary aspect, an apparatus of wireless communication includes means for receiving a scheduled transport format parameter for each of multiple transport blocks to be transmitted, means for determining a transmit power level adjustment for each transport block based on the scheduled transport format parameter, and means for transmitting each transport block using the transmit power level adjustment.

In another exemplary aspect, an apparatus of wireless communication includes means for determining a scheduled transport format parameter for each of multiple transport blocks to be transmitted by a mobile device, means for transmitting the scheduled transport format parameter to the mobile device, and means for receiving the transport blocks transmitted with a transmit power level adjustment that is based on the scheduled transport format parameter.

In another exemplary aspect, an apparatus for a wireless communication includes means for receiving first and second transport format parameters, means for determining a transmit power level adjustment based on the first and the second transport format parameters, and means for transmitting a transport block using the transmit power level adjustment.

In another exemplary aspect, a computer program product for wireless communications in a wireless network. The computer program product includes a non-transitory computer-readable medium having program code recorded thereon. The program code includes code to receive a scheduled transport format parameter for each of multiple transport blocks to be transmitted, code to determine a transmit power level adjustment for each transport block based on the scheduled transport format parameter, and code to transmit each transport block using the transmit power level adjustment.

In yet another exemplary aspect, a computer program product for wireless communications in a wireless network. The computer program product includes a non-transitory computer-readable medium having program code recorded thereon. The program code includes code to determine a scheduled transport format parameter for each of multiple transport blocks to be transmitted by a mobile device, code to transmit the scheduled transport format parameter to the mobile device, and code to receive the transport blocks transmitted with a transmit power level adjustment that is based on the scheduled transport format parameter.

In yet another exemplary aspect, a computer program product for wireless communications in a wireless network. The computer program product includes a non-transitory computer-readable medium having program code recorded thereon. The program code includes code to receive first and second transport format parameters, code to determine a transmit power level adjustment based on the first and the second transport format parameters, and code to transmit a transport block using the transmit power level adjustment.

In yet another exemplary aspect, an apparatus configured for wireless communication. The apparatus at least one processor and a memory coupled to the processor. The processor is configured to receive a scheduled transport format parameter for each of multiple transport blocks to be transmitted, to determine a transmit power level adjustment for each transport block based on the scheduled transport format parameter, and to transmit each transport block using the transmit power level adjustment.

In yet another exemplary aspect, an apparatus configured for wireless communication. The apparatus at least one processor and a memory coupled to the processor. The processor is configured to determine a scheduled transport format parameter for each of multiple transport blocks to be transmitted by a mobile device, to transmit the scheduled transport format parameter to the mobile device, and to receive the transport blocks transmitted with a transmit power level adjustment that is based on the scheduled transport format parameter.

In yet another exemplary aspect, an apparatus configured for wireless communication. The apparatus at least one processor and a memory coupled to the processor. The processor is configured to receive first and second transport format parameters, to determine a transmit power level adjustment based on the first and the second transport format parameters, and to transmit a transport block using the transmit power level adjustment.

Various aspects and features of the disclosure are described in further detail below.

DETAILED DESCRIPTION

Figure 1:
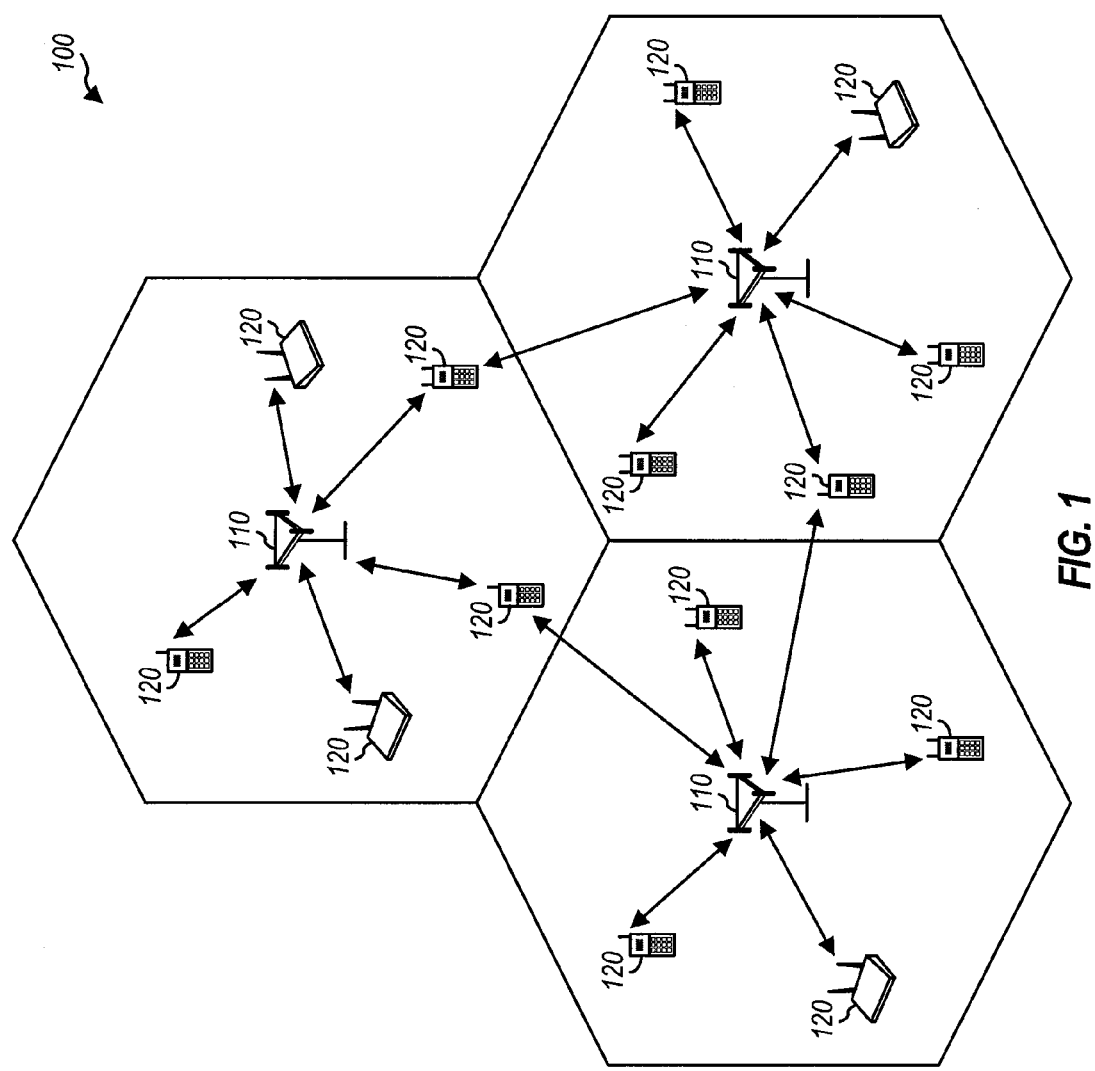
FIG. 1 depicts a wireless communication system.

As previously discussed, there is a need to provide for techniques for controlling transmit power of a user equipment in a MIMO system.

Briefly and in general terms, a user equipment may receive a message from a base station, indicating a desired transmit power level using a set of transport format parameters. The user equipment may calculate the desired transmit power level using the received transport format parameters. In some designs, the received transport format parameters may specify transmit power of a single transport block, while in other designs, the received transport format parameters may specify the transmit power for two transport blocks.

Briefly and in general terms, a base station may calculate a desired transmit power level for a transmission from a user equipment based on an operational parameter such as a signal to noise ratio, a block error rate or buffer fullness at the user equipment. The base station may use at least two transport format parameters for the calculation of transmit power of a transport block; a first parameter based on what the transport format would have been according to conventional techniques, and a second parameter based on what the transport format should be to achieve a certain performance target such as a block error rate or a signal to noise ratio value. In some designs, the base station may use additional transport format parameters for calculating the desired transmit power level applicable to the transmission of a second transport block also. In one aspect, the formula used for estimating the desired transmit power level for the transmission of two transport blocks may simplify to the formula used in conventional systems for estimating a desired transmit power level for a single transport block transmission.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a tablet, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.25, 2.5, 5, 10 or 20 mega-Hertz (MHz), respectively. The system bandwidth may correspond to a subset of the $K_s$ total subcarriers.

Figure 2:
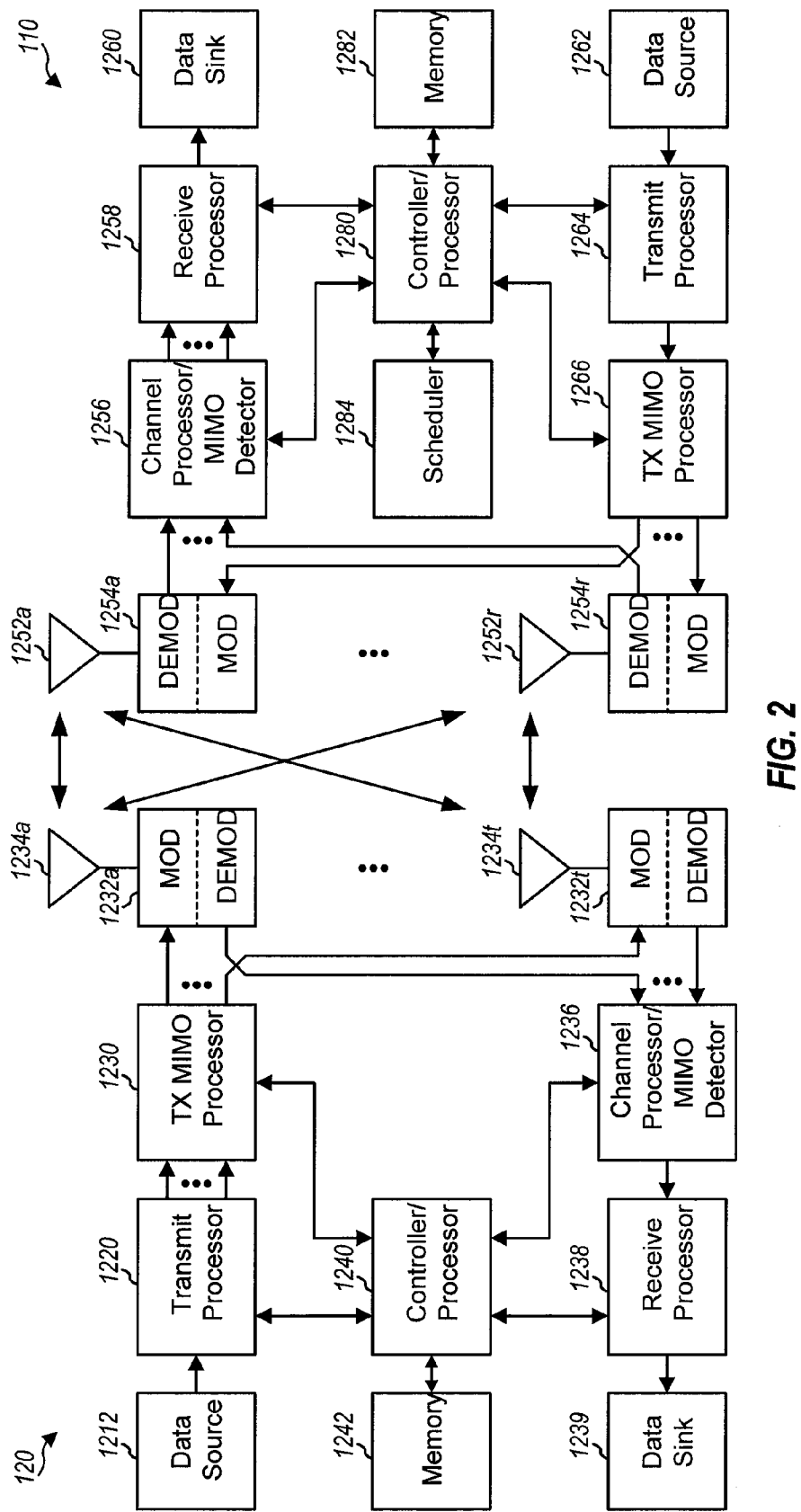
FIG. 2 depicts an exemplary transmission structure.

FIG. 2 shows a block diagram of a design of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 300 in FIG. 3, and/or other processes for the techniques described herein. Processor 1256, processor 1280, and/or other processors and modules at base station 110 may perform or direct process 500 in FIG. 5 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Rel-8 defines power control for a single transmit UE antenna configuration, known as single-in-multiple-out (SIMO) configuration. According to the SIMO Power Control in Rel-8, PUSCH Power Control in subframe i is calculated using the following formula:

$$P_{PUSCH}(i) = \min\{P_{CMAX}, 10\log_{10}(M_{PUSCH}(i)) + P_{O\_PUSCH}(j) + \alpha(j) \cdot PL + f(i) + \Delta_{TF}(i)\}[\text{dBm}] \quad \text{Eq. (1)}$$

The meanings of the parameters in Eq. (1) are described in Rel-8. The above formula in Eq. (1) may be simplified and rewritten as follows:

$$P_{PUSCH}(i) = \min\{P_{CMAX}, A(i) + \Delta_{TF}(i)\}[\text{dBm}] \quad \text{Eq. (2)}$$

Where the term A(i) represents the aggregate terms before Delta_TF. For Ks=1.25, $$\Delta_{TF}(i) = 10\log_{10}(2^{MPR \cdot Ks} - 1) \quad \text{Eq. (3)}$$

and for Ks=0, $$\Delta_{TF}(i) = 0 \quad \text{Eq. (4)}$$

In the description below, the parameter $\Delta_{TF}$ is also represented as DeltaTF. In some designs, the parameter Ks is a UE-specific parameter provided by the higher layer field deltaMCS-Enabled. The term MPR represents the quantity modulation density per resource element, or the amount of information bits conveyed by one resource element, to be used by the UE 120. The term MPR may be evaluated as follows:

$$MPR = \sum_{r=0}^{C-1} K_r / N_{RE} \quad \text{Eq. (4')}$$

where $\sum_{r=0}^{C-1} K_r$ represents the total number of information bits to be transmitted, and $N_{RE}$ represents the number of utilized resource elements.

For SIMO transmissions in Rel-8, DeltaTF may be used as follows:

First, the nominal signal to noise ratio (SNR) of uplink transmissions is power controlled to be around 0 dB (or X dB) through A(i) (See Eq. (2) above), where X is a operational nominal SNR value chosen by the eNB 110.

Next, a particular modulation and coding scheme (MCS) is selected according to the power control formula. In operation the transmit power (A(i)) of a UE 120 will be further compensated by DeltaTF. With additional compensation of DeltaTF, the actual SNR will be around DeltaTF dB (or X+DeltaTF dB).

In some designs, the operational SNR values may be chosen so that, with the SNR of DeltaTF dB, the scheduled transmission with the selected MCS may have around 10% block error rate (BLER) at the first transmission.

In the current version of Rel-10, the single antenna power control framework of Rel-8 has been extended to apply to MIMO Power Control. In the current version of Rel-10, no per antenna fast transmit power control (TPC) commands have been specified (i.e., single TPC command). Furthermore, the TPC calculations are based on a single path-loss estimation. In case of Ks=0, the transmit power is divided between transmitting antennas in accordance with the ratio of the precoding weights. Furthermore, for Ks>0, no agreements have been reached.

In certain designs, allowing Ks>0 may provide the eNB 110 more flexibility to choose the MCS for a UE 120. For example, under certain network traffic conditions, the TPC flexibility of choosing the MCS may facilitate allocation of higher power (i.e., higher SNR) transmission opportunities to a particular UE 120, for example to quickly empty the transmit buffer of the UE 120. However, the current version of Rel-10 does not use DeltaTF in case of MIMO operation in the uplink. Therefore, the current specification only allows eNB 110 to choose a particular MCS for a UE 120 (the original MCS, called MCS_original) to meet the target frame error rate requirement. MCS_original, therefore, may represent a transport format value using the conventional TPC calculations.

In some designs, in the case of uplink MIMO operation, with MCS dependent DeltaTF, the eNB 110 may be able to choose any MCS value: MCS_selected with appropriate power compensation.

In some designs, the physical uplink shared channel (PUSCH) power control in subframe i for Ks>0 may be performed using the same formula defined in Eq. (1) above. However, for Ks=1.25, the formula for DeltaTF may be redefined as follows (compare with Eq. (3) above):

$$\Delta_{TF}(i) = f(MPR_0^{Selected}, MPR_0^{Original}, MPR_1^{Selected}, MPR_1^{Original}) \quad \text{Eq. (5)}$$

The transport format parameters in Eq. (5) have the following meanings:

$MPR_0^{Selected}$: MPR derived from the selected MCS for TB 0, which is the MCS to be used for TB 0 in the corresponding PUSCH transmission $MPR_0^{Original}$: MPR derived from the original MCS for TB 0, which is the MCS that would have been scheduled for TB 0 without DeltaTF compensation, i.e. with A(i) only $MPR_1^{Selected}$: MPR derived from the selected MCS for TB 1, which is the MCS to be used for TB 1 in the corresponding PUSCH transmission $MPR_1^{Original}$: MPR derived from the original MCS for TB 1, which is the MCS that would have been scheduled for TB 1 without DeltaTF compensation, i.e. with A(i) only In some embodiments, the following function may be used for PUSCH power control in subframe i for Ks>0

$$\Delta_{TF}(i) = 10\log_{10}\left(\alpha \frac{2^{K_S \cdot MPR_0^{Selected}} - 1}{2^{K_S \cdot MPR_0^{Original}} - 1} + (1-\alpha) \frac{2^{K_S \cdot MPR_1^{Selected}} - 1}{2^{K_S \cdot MPR_1^{Original}} - 1}\right) \quad \text{Eq. (6)}$$

where α denotes the fraction of the total power A(i) allocated to TB 0.

For example, for rank=2 and 4 transmissions, α may be chosen to have the value 0.5. Furthermore, for rank=3, α may be chosen to have the value 0.5, if A(i) is equally divided among transmit antennas at the UE 120.

In case of rank-1 transmission, the formula in Eq. (6) for DeltaTF may be rewritten to depend on only two transport format parameters (e.g., corresponding to TB 0) as:

$$\Delta_{TF}(i) = 10\log_{10}\left(\frac{2^{K_S \cdot MPR_0^{Selected}} - 1}{2^{K_S \cdot MPR_0^{Original}} - 1}\right) \quad \text{Eq. (7)}$$

It will be appreciated that the rank-1 transmission formula of Eq. (7) useful in case of single antenna transmissions in a MIMO system, it is similar to the SIMO power control formula used in Rel-8:

$$\Delta_{TF}(i) = 10\log_{10}(2^{K_S \cdot MPR_0^{Selected}} - 1) \quad \text{Eq. (8)}$$

In some designs, with closed-loop power control, the original MPR may be controlled such that:

$$(2^{K_S \cdot MPR_0^{Original}} - 1) \cong 1.0 \quad \text{Eq. (9)}$$

The PUSCH power control in subframes i for Ks>0, as discussed above, may be communicated from the eNB 110 to the UE 120 using a variety of techniques. It will be noted that MPR characterizes transmission spectral efficiency and may be determined from the corresponding MCS index, for which values 0 to 31 are possible. Full signaling of one MCS index may therefore require 5 bits.

In some designs, signaling from the eNB 110 to the UE 120 may be made in UL grants. The communication in UL grants may allow the eNB 110 to dynamically adjust transmit power from the UE 120 on a subframe by subframe basis (e.g., every millisecond). In some designs, the dynamic signaling may comprises a full-bit message for each MCS index. For example, when each MCS index requires 5 bits, then 20 bits may be used for signaling.

In some designs, the dynamic signaling may be performed by signaling a subset of the MCS indices (e.g., two MCS indices) using a full bit-width field (e.g., 5 bits) and by signaling a difference between the "selected" and the "original" MCS indices for another subset. For example, a selected MCS indices for TB 0 and TB 1 may be transmitted using 5 bits each, and the difference from the Original MCS indices for TB 0 and TB 1 may be transmitted using less number of bits (e.g., 2 bits—thereby making four different difference values possible).

In some designs, the power control A(i) may be performed such that one of the TB's original MCS may be controlled around a default value. For example, the original MCS for TB 0 may be controlled at around 7 (corresponding to about 0 dB power). This default operation may, in one aspect, eliminate the need to signal the original MCS index for TB 0.

In some designs, the MCS selection capability may be enabled only for one transport block. For example, without loss of generality, it may be possible to signal transmit power for only TB 0, with no MCS adjustment made for TB 1. It will be appreciated that the partial enablement may also be performed along with the default value operation of an original MCS, as described above. In a combined implementation, the presently available 10 bits for MCS index signaling may be utilized.

In some designs, one or more of the transport format parameters $MPR_0^{Selected}$, $MPR_0^{Original}$, $MPR_1^{Selected}$, $MPR_1^{Original}$ may be semi-statically communicated. The semi-static signaling may signal either full-bit descriptions or the difference between "Selected MCS" and "Original MCS," as previously described.

As a non-limiting example, within one time duration, higher layer can configure the difference as follows:

For TB 0, MCS_Selected−MCS_Original=4
For TB 1, MCS_Selected−MCS_Original=2.
Referring to Eq. (6), for α=0.5, the equation may be rewritten as:

$$\Delta_{TF}(i) = 10\log_{10}\left(0.5 \cdot \frac{2^{K_S \cdot MPR_0^{Scheduled}} - 1}{2^{K_S \cdot MPR_0^{Original}} - 1} + 0.5 \cdot \frac{2^{K_S \cdot MPR_1^{Scheduled}} - 1}{2^{K_S \cdot MPR_1^{Original}} - 1}\right). \quad \text{Eq. (10)}$$

The two terms $$g_0 := \frac{2^{K_S \cdot MPR_0^{Scheduled}} - 1}{2^{K_S \cdot MPR_0^{Original}} - 1}$$

and $$g_1 := \frac{2^{K_S \cdot MPR_1^{Scheduled}} - 1}{2^{K_S \cdot MPR_1^{Original}} - 1} \text{ in Eq. (10)}$$

may denote the corresponding power scaling for TB 0 and TB 1 respectively. Eq. (10) may be considered to be a general form which allows full flexibility to schedule different MCS indices for different transport blocks.

In certain designs, the formula shown in Eq. (6) may be simplified as follows. In some designs, in DCI format 4, only the scheduled MCS indices for both transport blocks: $MCS_0^{Scheduled}$ and $MCS_1^{Scheduled}$ may be signaled with 10 bits. Without requiring additional signaling overhead for signaling of $MCS_0^{Original}$ and $MSC_1^{Original}$, the following assumption may be made: assume the same delta MCS index for both TBs, $$MCS_0^{Scheduled} - MCS_0^{Original} = MCS_1^{Scheduled} - MCS_1^{Original} \quad \text{Eq. (11)}$$

It will be appreciated by one of skill in the art, that the relationship between Rel-8 $\Delta_{TF}(i)$ in Eq. (3) and MCS index may be linear. Therefore, it may be assumed that:

$$(2^{K_S \cdot MPR_0^{Scheduled}} - 1)/(2^{K_S \cdot MPR_0^{Original}} - 1) = (2^{K_S \cdot MPR_1^{Scheduled}} - 1)/(2^{K_S \cdot MPR_1^{Original}} - 1) \quad \text{Eq. (12)}$$

Under the above conditions, $\Delta_{TF}(i)$ in Eq. (10) can be re-written as:

$$\Delta_{TF}(i) = \quad \text{Eq. (13)}$$

$$10\log_{10}\left(\frac{(2^{K_S \cdot MPR_0^{Scheduled}} - 1) + (2^{K_S \cdot MPR_1^{Scheduled}} - 1)}{(2^{K_S \cdot MPR_0^{Original}} - 1) + (2^{K_S \cdot MPR_1^{Original}} - 1)}\right),$$

or $$\Delta_{TF}(i) = 10\log_{10}\left((2^{K_S \cdot MPR_0^{Scheduled}} - 1) + (2^{K_S \cdot MPR_1^{Scheduled}} - 1)\right) - \quad \text{Eq. (14)}$$
$$10\log_{10}\left((2^{K_S \cdot MPR_0^{Original}} - 1) + (2^{K_S \cdot MPR_1^{Original}} - 1)\right).$$

By defining B as: B=10 $\log_{10}((2^{K_S \cdot MPR_0^{Original}} - 1) + (2^{K_S \cdot MPR_1^{Original}} - 1))$, and through fast TPC command f(i), power controlling A(i) such that B is always controlled around 0 dB, then the proposed formula for DeltaTF in case of multi-codeword transmission becomes:

$$\Delta_{TF}(i) = 10 \log_{10}((2^{K_S \cdot MPR_0^{Scheduled}} - 1) + (2^{K_S \cdot MPR_1^{Scheduled}} - 1)), \quad \text{Eq. (15)}$$

which matches Eq. (7) as proposed above.

In some designs, Eq. (10) may be simplified as follows. First, under the previously discussed assumptions, Eq. (10) can also be re-written as:

$$\Delta_{TF}(i) = 10\log_{10}\left(\frac{(2^{K_S \cdot MPR_0^{Scheduled}} - 1)}{(2^{K_S \cdot MPR_0^{Original}} - 1)}\right) \quad \text{Eq. (16)}$$

$$= 10\log_{10}\left(\frac{(2^{K_S \cdot MPR_1^{Scheduled}} - 1)}{(2^{K_S \cdot MPR_1^{Original}} - 1)}\right),$$

or equivalently, $$\Delta_{TF}(i) = 0.5 \cdot 10\log_{10}\left(\frac{(2^{K_S \cdot MPR_0^{Scheduled}} - 1)}{(2^{K_S \cdot MPR_0^{Original}} - 1)}\right) + \quad \text{Eq. (17)}$$

$$0.5 \cdot 10\log_{10}\left(\frac{(2^{K_S \cdot MPR_1^{Scheduled}} - 1)}{(2^{K_S \cdot MPR_1^{Original}} - 1)}\right).$$

then we have:

$$\Delta_{TF}(i) = 0.5 \cdot [10 \log_{10}(2^{K_S \cdot MPR_0^{Scheduled}} - 1) + 10 \log_{10}(2^{K_S \cdot MPR_1^{Scheduled}} - 1)] - 0.5 \cdot [10 \log_{10}(2^{K_S \cdot MPR_0^{Original}} - 1) + 10 \log_{10}(2^{K_S \cdot MPR_1^{Original}} - 1)] \quad \text{Eq. (18)}$$

By defining C as: C=0.5·[10 $\log_{10}(2^{K_S \cdot MPR_0^{Original}} - 1) + 10 \log_{10}(2^{K_S \cdot MPR_1^{Original}} - 1)$], and through fast TPC command f(i), power controlling A(i) such that C is controlled around 0 dB, then the proposed formula for DeltaTF in case of multi-codeword transmission becomes:

$$\Delta_{TF}(i) = 0.5 \cdot [10 \log_{10}(2^{K_S \cdot MPR_0^{Scheduled}} - 1) + 10 \log_{10}(2^{K_S \cdot MPR_1^{Scheduled}} - 1)], \quad \text{Eq. (19)}$$

which may be used for calculating transmit power.

The definitions of some parameters used in the above equations are as follows:

$MCS_0^{Scheduled}$: the MCS scheduled to be used by TB 0 in the scheduled PUSCH transmission $MPR_0^{Scheduled}$: MPR characterizing spectral efficiency per RE in each layer that codeword 0 is mapped onto; derived from the scheduled MCS for codeword 0

$MCS_1^{Scheduled}$: the MCS scheduled to be used by TB 1 in the scheduled PUSCH transmission $MPR_1^{Scheduled}$: MPR characterizing spectral efficiency per RE in each layer that codeword 1 is mapped onto; derived from the scheduled MCS for codeword.

As discussed above, designs for UL MIMO power control with $K_s$=1.25 are provided. The proposed power control formula (from Eq. 1) for LTE Rel-10 is as follows:

$$P_{PUSCH}(i) = \min\{P_{CMAX}, 10 \log_{10}(M_{PUSCH}(i)) + P_{O\_PUSCH}(j) + \alpha(j) \cdot PL + f(i) + \Delta_{TF}(i)\}[\text{dBm}]$$

For single-codeword transmission, $\Delta_{TF}(i)$ follows Rel-8 definition (from Eq. 8) for $$\Delta_{TF}(i) = 10 \log_{10}(2^{K_S \cdot MPR_0^{Scheduled}} - 1)$$

For multi-codeword transmission, $\Delta_{TF}(i)$ is modified as follows (from Eq. 15):

$$\Delta_{TF}(i) = 10 \log_{10}((2^{K_S \cdot MPR_0^{Scheduled}} - 1) + (2^{K_S \cdot MPR_1^{Scheduled}} - 1))$$

The total transmission power is equally divided among codewords (also referred to as transport blocks).

Figure 3:
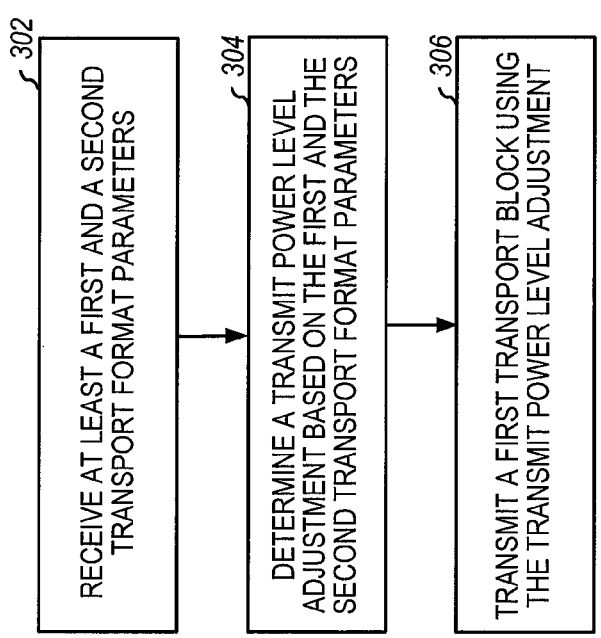
FIG. 3 is a functional block diagram illustrating example blocks executed to implement one aspect of the present disclosure.

FIG. 3 is a functional block diagram 300 illustrating example blocks executed, for example, at the UE 120, to implement one aspect of the present disclosure. At block 302, at least a first and a second transport format parameters are received by the UE 120. The transport format parameters may, for example, be the MCS parameters for TB 0, as discussed above with respect to Eq. (7). These transport format parameters reflect the spectral efficiency at the particular transport blocks. At block 304, the UE 120 determines a transmit power level adjustment based on the first and the second transport format parameters. The UE 120 determining the transmit power level adjustment in block 304 allows the transmission power to be adjusted according to the spectral efficiency. In some designs, the transmit power level may be calculated using Eqs. (1) and (7) discussed above. At block 306, the UE 120 transmits the first transport block (e.g., TB 0) using the determined transmit power level adjustment. As previously discussed, the desired transmit power level may be communicated dynamically or semi-statically.

Figure 4:
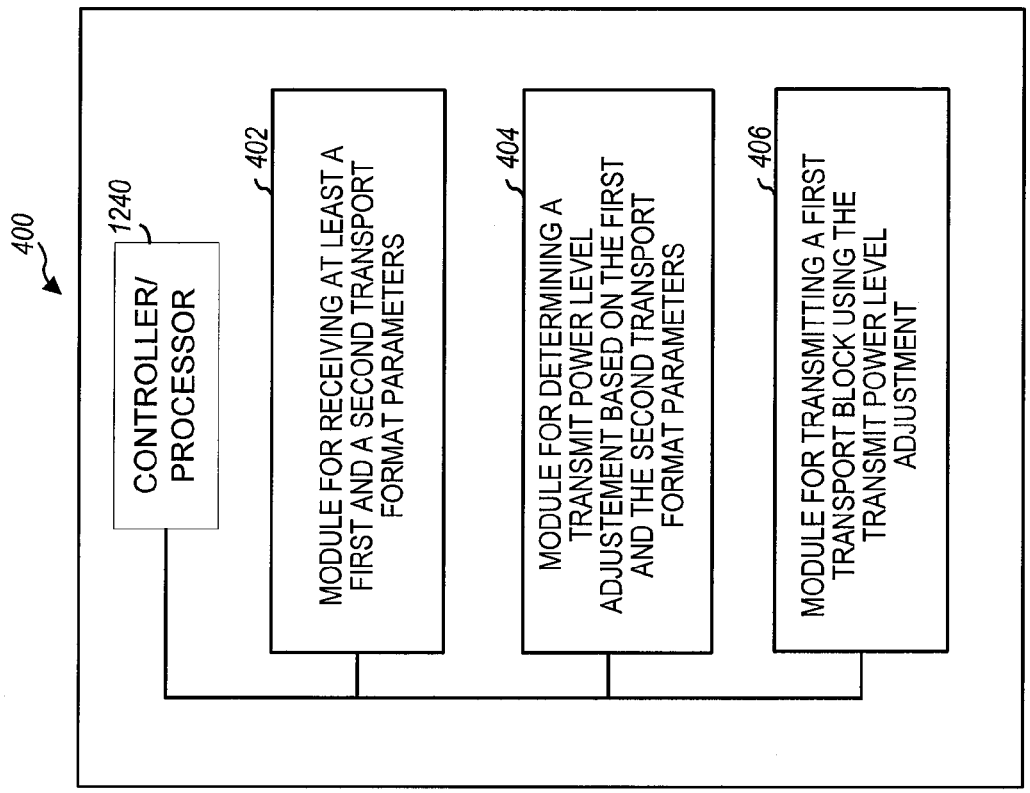
FIG. 4 is a block diagram representation of a wireless communication apparatus configured according to one aspect of the present disclosure.

FIG. 4 is a block diagram representation of a wireless communication apparatus 400, for example implemented at the UE 120. The apparatus 400 includes a controller/processor 1240. The controller/processor 1240 executes the various software and firmware present in the apparatus 400 and controls the basic functionalities and operation of apparatus 400. The apparatus 400 includes module 402 for receiving at least a first and a second transport format parameters. Under control of controller/processor 1240, the module 402 operates to receive at least first and second transport format parameters from a serving eNB. The module 402 executed by controller/processor 1240 provides means for receiving first and second transport format parameters. A module 404 is executed by controller/processor 1240 that determines a transmit power level adjustment based on the first and the second transport format parameters. In addition to the general transmission power level determined from the eNB, the apparatus 400 is further able to determine an adjustment to the general transmission power level, through execution of module 404, to accommodate for the spectral efficiency determined through the first and second transport format parameters. The module 404, executed by controller/processor 1240 provides means for determining a transmit power level adjustment based on the first and second transport format parameters. A module 406 is also executed by controller/processor 1240 that transmits a first transport block using the transmit power level adjustment to the general transmission power level. The module 406, executed by controller/processor 1240, provides means for transmitting a transport block using the transmit power level adjustment.

Figure 5:
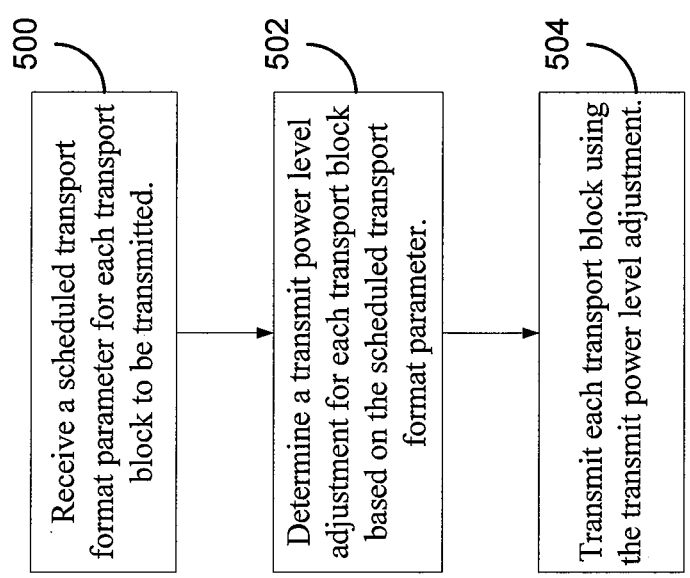
FIG. 5 is a functional block diagram illustrating example blocks executed to implement one aspect of the present disclosure.

FIG. 5 is a functional block diagram illustrating example blocks executed to implement one aspect of the present disclosure. For example, such functional blocks may be implemented at the UE 120. In the example illustrated in FIG. 5, the UE 120 is operating with multiple transmit antennas to transmit multiple transport blocks. In block 500, the UE 120 receives a scheduled transport format parameter for each transport block to be transmitted. Using the scheduled transport format parameters, the UE 120 determines, in block 502, a transmit power level adjustment for each of the transport blocks. In block 504, the UE 120 transmits each transport block using the corresponding transmit power level adjustment.

Figure 6:
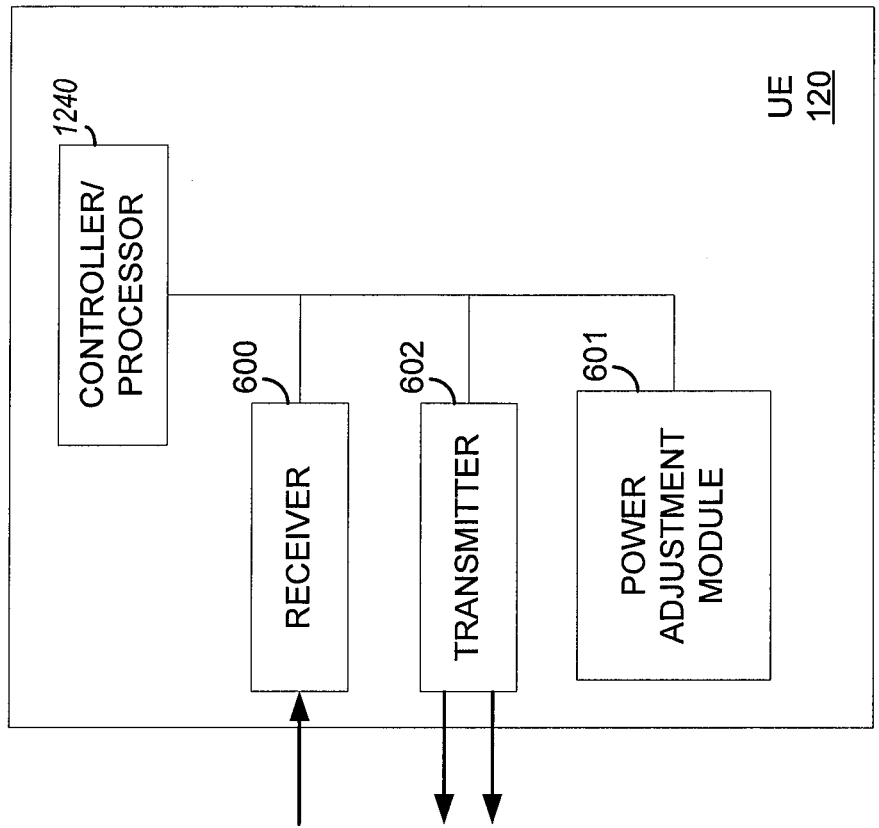
FIG. 6 is a block diagram illustrating a UE configured according to one aspect of the present disclosure.

FIG. 6 is a block diagram illustrating a UE 120 configured according to one aspect of the present disclosure. UE 120 includes a controller/processor 1240. The controller/processor 1240 executes the various software and firmware present in UE 120 and controls the basic functionalities and operation of UE 120. A receiver 600 in UE 120, under control of controller/processor 1240, operates to receive scheduled transport format parameters for each of multiple transport blocks that UE 120 is to transmit. The receiver 600 may be embodied using such components and hardware such as antennas 1234a-1234t, demodulators 1232a-1232t, channel processor/MIMO detector 1236, and receive processor 1238. The receiver 600, operating under control of controller/processor 1240, provides means for receiving a scheduled transport format parameter for each of multiple transport blocks to be transmitted by UE 120.

A power adjustment module 601, when executed by controller/processor 1240, uses the scheduled transport format parameters received from the eNB to determine a power level adjustment for each transport block. The scheduled transport format parameters relate to the spectral efficiency for the particular transport block. Thus, UE 120 may adjust the regular power level according to the specific spectral efficiency. The power adjustment module 601, executed by the controller/processor 1240, provides means for determining a transmit power level adjustment for each transport block based on the scheduled transport format parameter.

The UE 120 also includes a transmitter 602. Under control of controller/processor 1240, transmitter 602 transmits each transport block using the transmit power level adjustment to adjust the transmission power. The transmitter 602 may be embodied using such components and hardware such as antennas 1234a-1234t, modulators 1232a-1232t, TX MIMO detector 1230, and transmit processor 1220. The transmitter 602, operating under control of controller/processor 1240, provides means for transmitting each transport block using the transmit power level adjustment.

Figure 7:
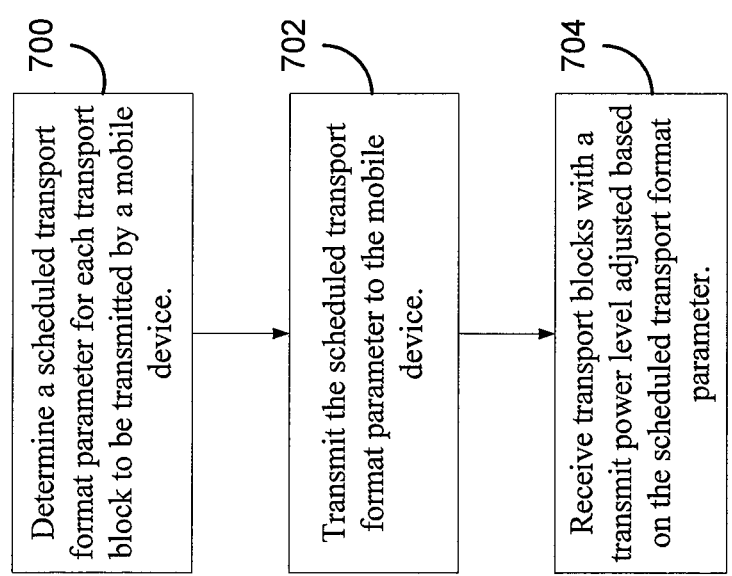
FIG. 7 is a functional block diagram illustrating example blocks executed to implement one aspect of the present disclosure.

FIG. 7 is a functional block diagram illustrating example blocks executed to implement one aspect of the present disclosure. In block 700, an eNB, such as eNB 110, determines a scheduled transport format parameter for each transport block to be transmitted by mobile devices within its service area. eNB 110 may determine the scheduled transport format parameters based on channel quality metrics provided by the various served UEs. The scheduled transport format parameters are transmitted to the associated mobile devices in block 702. In block 704, the eNB 110 receives transport blocks transmitted by the UEs with a transmit power level adjusted based on the scheduled transport format parameters. Thus, in addition to the regular transmission power set based on a eNB power control message, the UE is able to provide additional adjustments based on the spectral efficiency associated with each transport block, as determined by the scheduled transport format parameters transmitted from eNB 110.

Figure 8:
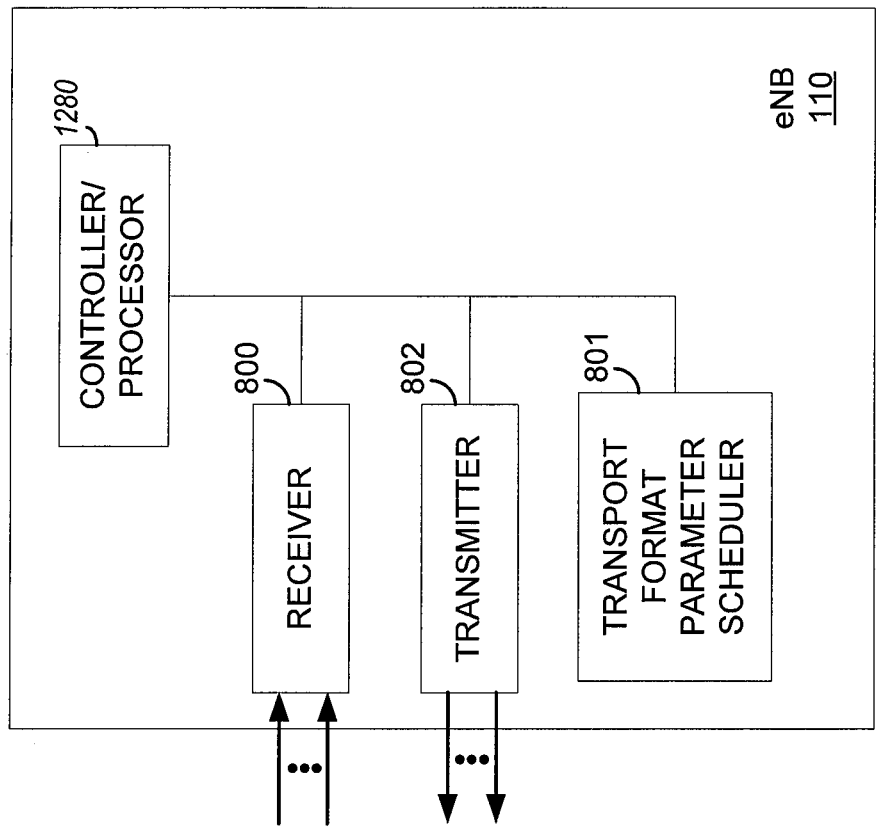
FIG. 8 is a block diagram illustrating an evolved Node B (eNB) configured according to one aspect of the present disclosure.

FIG. 8 is a block diagram illustrating an eNB 110 configured according to one aspect of the present disclosure. eNB 110 includes a controller/processor 1280. The controller/processor 1280 executes the various software and firmware present in eNB 110 and controls the basic functionalities and operation of eNB 110. A transport format parameter scheduler 801, executed by controller/processor 1280, uses information regarding the spectral efficiency for each potential transport block and determines a scheduled transport format parameter for each transport block of each UE within its serving area. One non-limiting example of such a transport format parameter is the MCS. eNB 110 may select a different MCS based on the spectral efficiency or channel quality for the various served UEs. The transport format parameter scheduler 801, along with controller/processor 1280, provide means for determining a scheduled transport format parameter for each transport block to be transmitted by a mobile device.

A transmitter 802, under control of controller/processor 1280, transmits the scheduled transport format parameters to the associated UEs. The transmitter 802 may be embodied using such components and hardware such as antennas 1252a-1252r, modulators 1254a-1254r, TX MIMO detector 1266, and transmit processor 1264. The transmitter 802, operating under control of controller/processor 1280, provides means for transmitting the scheduled transport format parameter to the mobile device.

A receiver 800 in eNB 110, under control of controller/processor 1280, operates to receive transport blocks transmitted by the served UEs. The transport blocks are received with the power level adjusted by a transmit power level adjustment determined by the UEs based on the scheduled transport format parameters sent by eNB 110. The receiver 800 may be embodied using such components and hardware such as antennas 1252a-1252r, demodulators 1254a-1254r, channel processor/MIMO detector 1256, and receive processor 1258. The receiver 800, operating under control of controller/processor 1280, provides means for receiving transport blocks with a transmit power level adjusted based on the scheduled transport format parameter.

It will be appreciated that techniques for controlling transmit power of a UE 120 are disclosed. In one aspect, the techniques allow for a flexible power control, based on a calculation using an actual and a original value of a transport format. In another aspect, the desired transmit power level may be communicated from the eNB 110 to the UE 120 dynamically, e.g., using uplink grants, or semi-statically, e.g., using a higher layer message.

It will be further appreciated that the disclosed techniques are applicable to rank 1 transmission in a MIMO system, where additional flexibility for selecting an MCS for transmit power control is made possible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a scheduled transport format parameter for each of a plurality of transport blocks to be transmitted;
   determining a transmit power level adjustment for each transport block based on the scheduled transport format parameter;
   transmitting each transport block using the transmit power level adjustment; and determining a spectral efficiency based on the scheduled transport format parameter, wherein the determining the transmit power level adjustment is based on the spectral efficiency.

2. The method of claim 1, wherein the scheduled transport format parameter includes a scheduled modulation and coding scheme (MCS) value for each transport block and the spectral efficiency includes a scheduled modulation per resource element (MPR) value based on the scheduled MCS value.

3. The method of claim 1,
wherein the determining the transmit power level adjustment includes assuming a same difference between the scheduled transport format parameter and an original transport format parameter for each transport block.

4. The method of claim 1, wherein the receiving includes receiving the scheduled transport format parameter in an uplink grant message.

5. The method of claim 1, wherein the determining the transmit power level adjustment includes calculating the transmit power level adjustment using:

$$\Delta_{TF}(i) = 10\log_{10}((2^{K_S \cdot MPR_0^{Scheduled}} - 1) + (2^{K_S \cdot MPR_1^{Scheduled}} - 1)),$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

6. The method of claim 1, wherein the determining the transmit power level adjustment includes calculating the transmit power level adjustment using:

$$\Delta_{TF}(i) = 0.5 \cdot [10\log_{10}(2^{K_S \cdot MPR_0^{Scheduled}} - 1) + 10\log_{10}(2^{K_S \cdot MPR_1^{Scheduled}} - 1)],$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

7. A method of wireless communication, comprising:
determining a scheduled transport format parameter for each of a plurality of transport blocks to be transmitted by a mobile device;
transmitting the scheduled transport format parameter to the mobile device; and
receiving the transport blocks transmitted with a transmit power level adjustment that is determined based on a spectral efficiency, wherein the spectral efficiency is based on the scheduled transport format parameter.

8. The method of claim 7, wherein the scheduled transport format parameter includes a first scheduled modulation and coding scheme (MCS) value for a first transport block and a second scheduled MCS value for a second transport block.

9. A method for a wireless communication, comprising:
receiving first and second transport format parameters for a transport block;
determining a transmit power level adjustment that that is determined based on a spectral efficiency, wherein the spectral efficiency is based on the first and the second transport format parameters; and
transmitting the transport block using the transmit power level adjustment.

10. The method of claim 9, further including:
receiving third and fourth transport format parameters; and
transmitting another transport block using the transmit power level adjustment,
wherein the determining further includes determining the transmit power level adjustment based on the third and the fourth transport format parameters.

11. The method of claim 10, wherein the determining the transmit power level adjustment includes calculating a weighted average of a first value and a second value, the first value being based on the first and the second transport format parameters and the second value being based on the third and the fourth transport format parameters.

12. The method of claim 10, wherein the first transport format parameter includes a scheduled modulation and coding scheme (MCS) value for the transport block, and wherein the determining further includes calculating a scheduled modulation per resource block (MPR) value based on the scheduled MCS value, and wherein the second transport format parameter includes an original MCS value for the transport block, wherein the determining further includes calculating an original MPR value based on the original MCS value; and
wherein the third transport format parameter includes another scheduled modulation and coding scheme (MCS) value for the another transport block, and wherein the determining further includes calculating another scheduled modulation per resource block (MPR) value based on the another scheduled MCS value, and the fourth transport format parameter includes another original MCS value for the another transport block, wherein the determining further includes calculating another original MPR value based on the another original MCS value.

13. The method of claim 12, wherein the determining the transmit power level adjustment includes calculating the transmit power level adjustment using:

$$\Delta_{TF}(i) = 10\log_{10}\left(\alpha \frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right)$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

14. The method of claim 10, wherein the receiving includes receiving a first subset of the first, second, third, and fourth transport format parameters as a difference from a second subset of the first, second, third, and fourth transport format parameters.

15. The method of claim 9, wherein the receiving includes receiving the first and the second transport format parameters in an uplink grant message.

16. The method of claim 9, wherein the receiving includes receiving the first and the second transport format parameters in a semi-static configuration message.

17. The method of claim 9, wherein the first transport format parameter includes a scheduled modulation and coding scheme (MCS) value for the transport block, and wherein the determining further includes calculating a scheduled modulation per resource block (MPR) value based on the scheduled MCS value, and wherein the second transport format parameter includes an original MCS value for the transport block, wherein the determining further includes calculating an original MPR value based on the original MCS value.

18. The method of claim 9, wherein the determining the transmit power level adjustment includes calculating the transmit power level adjustment using:

$$\Delta_{TF}(i) = 10\log_{10}\left(\alpha\frac{2^{K_S \cdot MPR_0^{Scheduled}}-1}{2^{K_S \cdot MPR_0^{Original}}-1} + (1-\alpha)\frac{2^{K_S \cdot MPR_1^{Scheduled}}-1}{2^{K_S \cdot MPR_1^{Original}}-1}\right),$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

19. A apparatus of wireless communication, comprising:
means for receiving a scheduled transport format parameter for each of a plurality of transport blocks to be transmitted;
means for determining a transmit power level adjustment for each transport block based on the scheduled transport format parameter;
means for transmitting each transport block using the transmit power level adjustment; and
means for determining a spectral efficiency based on the scheduled transport format parameter, wherein the means for determining the transmit power level adjustment is based on the spectral efficiency.

20. The apparatus of claim 19, wherein the scheduled transport format parameter includes a scheduled modulation and coding scheme (MCS) value for each transport block and the spectral efficiency includes a scheduled modulation per resource element (MPR) value based on the scheduled MCS value.

21. The apparatus of claim 19,
wherein the means for determining the transmit power level adjustment includes assuming a same difference between the scheduled transport format parameter and an original transport format parameter for each transport block.

22. The apparatus of claim 19, wherein the means for receiving includes means for receiving the scheduled transport format parameter in an uplink grant message.

23. The apparatus of claim 19, wherein the means for determining the transmit power level adjustment includes means for calculating the transmit power level adjustment using:

$$\Delta_{TF}(i)=10\log_{10}((2^{K_S \cdot MPR_0^{Scheduled}}-1)+(2^{K_S \cdot MPR_1^{Scheduled}}-1)),$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

24. The apparatus of claim 19, wherein the means for determining the transmit power level adjustment includes means for calculating the transmit power level adjustment using:

$$\Delta_{TF}(i)=0.5\cdot[10\log_{10}(2^{K_S \cdot MPR_0^{Scheduled}}-1)+10\log_{10}(2^{K_S \cdot MPR_1^{Scheduled}}-1)],$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

25. A apparatus of wireless communication, comprising:
means for determining a scheduled transport format parameter for each of a plurality of transport blocks to be transmitted by a mobile device;
means for transmitting the scheduled transport format parameter to the mobile device; and
means for receiving the transport blocks transmitted with a transmit power level adjustment that is determined based on a spectral efficiency, wherein the spectral efficiency is based on the scheduled transport format parameter.

26. The apparatus of claim 25, wherein the scheduled transport format parameter includes a first scheduled modulation and coding scheme (MCS) value for a first transport block and a second scheduled MCS value for a second transport block.

27. A apparatus for a wireless communication, comprising:
means for receiving first and second transport format parameters for a transport block;
means for determining a transmit power level adjustment that that is determined based on a spectral efficiency, wherein the spectral efficiency is based on the first and the second transport format parameters; and
means for transmitting the transport block using the transmit power level adjustment.

28. The apparatus of claim 27, further including:
means for receiving third and fourth transport format parameters; and
means for transmitting another transport block using the transmit power level adjustment,
wherein the means for determining further includes means for determining the transmit power level adjustment based on the third and the fourth transport format parameters.

29. The apparatus of claim 28, wherein the means for determining the transmit power level adjustment includes means for calculating a weighted average of a first value and a second value, the first value being based on the first and the second transport format parameters and the second value being based on the third and the fourth transport format parameters.

30. The apparatus of claim 28, wherein the first transport format parameter includes a scheduled modulation and coding scheme (MCS) value for the transport block, and wherein the means for determining further includes means for calculating a scheduled modulation per resource block (MPR) value based on the scheduled MCS value, and wherein the second transport format parameter includes an original MCS value for the transport block, wherein the means for determining further includes means for calculating an original MPR value based on the original MCS value; and
wherein the third transport format parameter includes another scheduled modulation and coding scheme (MCS) value for the another transport block, and wherein the means for determining further includes means for calculating another scheduled modulation per resource block (MPR) value based on the another scheduled MCS value, and the fourth transport format parameter includes another original MCS value for the another transport block, wherein the means for determining further includes calculating another original MPR value based on the another original MCS value.

31. The apparatus of claim 30, wherein the means for determining the transmit power level adjustment includes means for calculating the transmit power level adjustment using:

$$\Delta_{TF}(i) = 10\log_{10}\left(\alpha \frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right)$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

32. The apparatus of claim 28, wherein the means for receiving includes means for receiving a first subset of the first, second, third, and fourth transport format parameters as a difference from a second subset of the first, second, third, and fourth transport format parameters.

33. The apparatus of claim 27, wherein the means for receiving includes means for receiving the first and the second transport format parameters in an uplink grant message.

34. The apparatus of claim 27, wherein the means for receiving includes means for receiving the first and the second transport format parameters in a semi-static configuration message.

35. The apparatus of claim 27, wherein the first transport format parameter includes a scheduled modulation and coding scheme (MCS) value for the transport block, and wherein the means for determining further includes means for calculating a scheduled modulation per resource block (MPR) value based on the scheduled MCS value, and wherein the second transport format parameter includes an original MCS value for the transport block, wherein the means for determining further includes means for calculating an original MPR value based on the original MCS value.

36. The apparatus of claim 27, wherein the means for determining the transmit power level adjustment includes means for calculating the transmit power level adjustment using:

$$\Delta_{TF}(i) = 10\log_{10}\left(\alpha \frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right)$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

37. A non-transitory computer-readable medium having program code recorded thereon, the program code including:
program code to receive a scheduled transport format parameter for each of a plurality of transport blocks to be transmitted;
program code to determine a transmit power level adjustment for each transport block based on the scheduled transport format parameter; and
program code to transmit each transport block using the transmit power level adjustment; and
program code to determine a spectral efficiency based on the scheduled transport format parameter, wherein the program code to determine the transmit power level adjustment is executed based on the spectral efficiency.

38. The non-transitory computer-readable medium of claim 37, wherein the program code to determine the transmit power level adjustment includes assuming a same difference between the scheduled transport format parameter and an original transport format parameter for each transport block.

39. The non-transitory computer-readable medium of claim 37, wherein the program code to receive includes program code to receive the scheduled transport format parameter in an uplink grant message.

40. The non-transitory computer-readable medium of claim 37, wherein the program code to determine the transmit power level adjustment includes program code to calculate the transmit power level adjustment using:

$$\Delta_{TF}(i) = 0.5 \cdot [10 \log_{10}(2^{K_S \cdot MPR_0^{Scheduled}} - 1) + 10 \log_{10}(2^{K_S \cdot MPR_1^{Scheduled}} - 1)],$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

41. The non-transitory computer-readable medium of claim 37, wherein the program code to determine the transmit power level adjustment includes program code to calculate the transmit power level adjustment using:

$$\Delta_{TF}(i) = 10 \log_{10}((2^{K_S \cdot MPR_0^{Scheduled}} - 1) + (2^{K_S \cdot MPR_1^{Scheduled}} - 1)),$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

42. A non-transitory computer-readable medium having program code recorded thereon, the program code including:
program code to determine a scheduled transport format parameter for each of a plurality of transport blocks to be transmitted by a mobile device;
program code to transmit the scheduled transport format parameter to the mobile device; and
program code to receive the transport blocks transmitted with a transmit power level adjustment that is determined based on a spectral efficiency, wherein the spectral efficiency is based on the scheduled transport format parameter.

43. A non-transitory computer-readable medium having program code recorded thereon, the program code including:

program code to receive first and second transport format parameters for a transport block;
program code to determine a transmit power level adjustment that that is determined based on a spectral efficiency, wherein the spectral efficiency is based on the first and the second transport format parameters; and
program code to transmit the transport block using the transmit power level adjustment.

44. The non-transitory computer-readable medium of claim 43, further including:
program code to receive third and fourth transport format parameters; and
program code to transmit another transport block using the transmit power level adjustment,
wherein the program code to determine further includes program code to determine the transmit power level adjustment based on the third and the fourth transport format parameters.

45. The non-transitory computer-readable medium of claim 44, wherein the program code to determine the transmit power level adjustment includes program code to calculate the transmit power level adjustment using:

$$\Delta_{TF}(i) = 10\log_{10}\left(\alpha\frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right),$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

46. The non-transitory computer-readable medium of claim 43, wherein the program code to determine the transmit power level adjustment includes program code to calculate the transmit power level adjustment using:

$$\Delta_{TF}(i) = 10\log_{10}\left(\alpha\frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right),$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

47. An apparatus configured for wireless communication, the apparatus comprising:
at least one processor; and
a memory coupled to the at least one processor,
wherein the at least one processor is configured:
to receive a scheduled transport format parameter for each of a plurality of transport blocks to be transmitted;
to determine a transmit power level adjustment for each transport block based on the scheduled transport format parameter; and
to transmit each transport block using the transmit power level adjustment; and
to determine a spectral efficiency based on the scheduled transport format parameter, wherein the configuration of the at least one processor to determine the transmit power level adjustment is executed based on the spectral efficiency.

48. The apparatus of claim 47, wherein the configuration of the at least one processor to determine the transmit power level adjustment includes configuration to assume a same difference between the scheduled transport format parameter and an original transport format parameter for each transport block.

49. The apparatus of claim 47, wherein the configuration of the at least one processor to determine the transmit power level adjustment includes configuration to calculate the transmit power level adjustment using:

$$\Delta_{TF}(i) = 10\log_{10}((2^{K_S \cdot MPR_0^{Scheduled}} - 1) + (2^{K_S \cdot MPR_1^{Scheduled}} - 1)),$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

50. The apparatus of claim 47, wherein the configuration of the at least one processor to determine the transmit power level adjustment includes configuration to calculate the transmit power level adjustment using:

$$\Delta_{TF}(i) = 0.5 \cdot [10\log_{10}(2^{K_S \cdot MPR_0^{Scheduled}} - 1) + 10\log_{10}(2^{K_S \cdot MPR_1^{Scheduled}} - 1)],$$

wherein $K_s$ is a mobile device-specific parameter indicated enablement of the transmit power level adjustment, $MPR_0^{Scheduled}$ is a scheduled modulation per resource element (MPR) for a first transport block, and $MPR_1^{Scheduled}$ is a scheduled MPR for a second transport block.

51. An apparatus configured for wireless communication, the apparatus comprising:
at least one processor; and
a memory coupled to the at least one processor,
wherein the at least one processor is configured:
to determine a scheduled transport format parameter for each of a plurality of transport blocks to be transmitted by a mobile device;
to transmit the scheduled transport format parameter to the mobile device; and
to receive the transport blocks transmitted with a transmit power level adjustment that is determined based on a spectral efficiency, wherein the spectral efficiency is based on the scheduled transport format parameter.

52. An apparatus configured for wireless communication, the apparatus comprising:
at least one processor; and
a memory coupled to the at least one processor,
wherein the at least one processor is configured:
to receive first and second transport format parameters for a transport block;
to determine a transmit power level adjustment that that is determined based on a spectral efficiency, wherein the spectral efficiency is based on the first and the second transport format parameters; and
to transmit the transport block using the transmit power level adjustment.

53. The apparatus of claim 52, wherein the at least one processor is further configured:
to receive third and fourth transport format parameters; and
to transmit another transport block using the transmit power level adjustment,
wherein the configuration of the at least one processor to determine further includes configuration to determine the transmit power level adjustment based on the third and the fourth transport format parameters.

54. The apparatus of claim 53, wherein the configuration of the at least one processor to determine the transmit power level adjustment includes configuration to calculate the transmit power level adjustment using:

$$\Delta_{TF}(i) = 10\log_{10}\left(\alpha \frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right)$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

55. The apparatus of claim 52, wherein the configuration of the at least one processor to determine the transmit power level adjustment includes configuration to calculate the transmit power level adjustment using:

$$\Delta_{TF}(i) = 10\log_{10}\left(\alpha \frac{2^{K_S \cdot MPR_0^{Scheduled}} - 1}{2^{K_S \cdot MPR_0^{Original}} - 1} + (1-\alpha)\frac{2^{K_S \cdot MPR_1^{Scheduled}} - 1}{2^{K_S \cdot MPR_1^{Original}} - 1}\right)$$

wherein $K_s$ is a mobile device-specific parameter indicated enablement of the transmit power level adjustment, $\alpha$ denotes the fraction of total power allocated to a first transport block, $MPR_0^{Original}$ is an original modulation per resource element (MPR) for the first transport block, $MPR_0^{Scheduled}$ is a scheduled MPR for the first transport block, $MPR_1^{Original}$ is an original MPR for a second transport block, and $MPR_1^{Scheduled}$ is a scheduled MPR for the second transport block.

\* \* \* \* \*